United States Patent [19]

Reiser

[11] 4,080,487
[45] Mar. 21, 1978

[54] PROCESS FOR COOLING MOLTEN CARBONATE FUEL CELL STACKS AND APPARATUS THEREFOR

[75] Inventor: Carl A. Reiser, Glastonbury, Conn.

[73] Assignee: United Technologies Corporation, Hartford, Conn.

[21] Appl. No.: 767,109

[22] Filed: Feb. 9, 1977

[51] Int. Cl.² ............................................. H01M 8/06
[52] U.S. Cl. ........................................ 429/16; 429/26
[58] Field of Search ................... 429/16, 17, 18, 26

[56] References Cited

U.S. PATENT DOCUMENTS

| 3,458,357 | 7/1969 | Truitt | 429/18 |
| 3,522,102 | 7/1970 | Trachtenberg | 429/16 |

Primary Examiner—John H. Mack
Assistant Examiner—Hugh Feeley
Attorney, Agent, or Firm—Stephen E. Revis

[57] ABSTRACT

In a fuel cell power plant comprising a plurality of stacks of molten carbonate fuel cells the $CO_2$ produced at the anodes of the cells is combined with the process air for the cathode side of the stacks. The $CO_2$ rich mixture is fed from stack to stack in series through the cathode sides thereof with heat being removed from the cathode side exhaust streams between consecutive stacks. This process improves cell performance by increasing the $CO_2$ partial pressure within the stacks. The process also makes it possible to reduce the required heat exchanger heat transfer area needed to cool the cell exhaust products.

10 Claims, 2 Drawing Figures

PROCESS FOR COOLING MOLTEN CARBONATE FUEL CELL STACKS AND APPARATUS THEREFOR

BACKGROUND OF THE INVENTION

1. Field of the Invention

This invention relates to molten carbonate fuel cell power plants.

2. Description of the Prior Art

Molten carbonate fuel cells are well know in the art. These cells comprise an ion conducting molten carbonate electrolyte sandwiched between an anode and cathode electrode. Cells of this type are somewhat more fully described in commonly owned U.S. Pat. Nos. 3,878,296 Vine et al. and 3,615,839 Thompson et al.

The design of any commercial power plant has as one of its major considerations the cost per kilowatt of electricity produced. Cost per kilowatt includes both capital expense and operating expense. Obviously, it is extremely important that the fuel cells operate efficiently, but the cost for obtaining high efficiency cannot be excessive. Cell efficiency is directly tied to the suitability of the fuel and oxidant compositions supplied to the anode and cathode, respectively. The anode reaction in a molten carbonate fuel cell is shown by the following equation:

$$CO_3^= + H_2 \rightarrow CO_2 + H_2O + 2e^-$$

The cathode reaction is shown by the following equation:

$$\tfrac{1}{2} O_2 + CO_2 + 2e^- \rightarrow CO_3^=$$

The unique difference between the anode and cathode reactions of molten carbonate fuel cells as compared to the anode and cathode reactions of more conventional acid or base electrolyte fuel cells is that the molten carbonate cells consume carbon dioxide at the cathode and produce carbon dioxide at the anode.

Good performance (high current density at high cell voltage) in a molten carbonate fuel cell necessarily requires reasonably high partial pressures of both carbon dioxide and oxygen at the cathode. It is generally agreed that a practical molten carbonate fuel cell system requires the carbon dioxide produced at the anode be returned to the cathode since the air used as the oxidant at the cathode does not naturally contain enough carbon dioxide for efficient performance. The aforementioned Thompson et al patent discloses one technique for accomplishing this task: transferring the $CO_2$ in the anode exhaust to the cathode inlet air stream by means of a membrane selectively permeable to $CO_2$. Another technique is to combine the entire anode exhaust with the cathode inlet air stream, such as shown in U.S. Pat. No. 3,436,271 Cole et al. Ideally, it is desirable to have twice as much $CO_2$ as $O_2$ in the oxidant stream since two moles of $CO_2$ are consumed for each mole of $O_2$.

Another important consideration in the design of commercially feasible molten carbonate fuel cell power plants is cell cooling. Molten carbonate cells typically operate at temperatures of about 1200° F. Considerable quantities of heat are produced during operation which must be removed to prevent overheating of the cells. Cooling the cells in an economical manner can make the difference between commercial success and failure.

One method of cooling a plurality of molten carbonate fuel cell stacks is to use the process air stream for cooling as well as for delivery of the cathode side fuel cell reactants. With this method the air, enriched with $CO_2$ from the anode exhaust, is divided into equal portions and passes in parallel through the cathode side of the stacks. This cooling method is hereinafter referred to as single pass process air cooling. (Process air, as that term is used herein, simply means the air used in the electrochemical process.) Single pass process air cooling has the drawback that, for a system with "$n$" stacks, the process air stream for each stack is limited to receiving only $1/n$ times the amount of $CO_2$ produced by the stacks. Diluting this amount of $CO_2$ with the necessary amount of air for cooling results in $CO_2$ partial pressures which are often less than satisfactory, resulting in a power plant which may not be commercially attractive.

From a fuel cell performance point of view, the best method for cooling the fuel cells is with a cooling stream which passes through the cells but is separate from the process air stream. This permits the lowest possible air flow rate at the cathode since the process air is not needed for cooling; $CO_2$ partial pressure is therefore maximized. This method, however, requires separate cooling fluid passageways within the stack, which adds considerable expense to the stacks and is a complex technical problem.

SUMMARY OF THE INVENTION

One object of the present invention is a molten carbonate fuel cell system which is economically attractive.

Another object of the present invention is a method for cooling molten carbonate fuel cells which is economically attractive.

Accordingly, a process for operating a fuel cell power plant, including a plurality of stacks of molten carbonate fuel cells, comprises the steps of introducing the $CO_2$ produced at the anode side of the stacks into the cathode side process air supply upstream of the stacks, feeding the $CO_2$ rich process air from stack to stack in series, and removing heat from the cathode side exhaust stream between the stacks.

In the process of the present invention (hereinafter referred to as "multi-pass process air cooling") the quantity of air needed for cooling the plurality of stacks in the series is nearly the same as that needed for cooling each stack in a single pass process air cooling system. This is made possible by removing heat from the cathode exhaust stream between the stacks. In addition note that, in the system of the present invention, all of the $CO_2$ produced at the anodes of all the stacks is present in the process air stream supplied to the cathode side of the first stack in the series. The first stack in the series will, therefore, have a considerably higher $CO_2$ partial pressure than any stack of a single pass process air cooling system. Furthermore, in a single pass process air cooling system any $CO_2$ not consumed in each stack is lost; in the present invention the unconsumed $CO_2$ from the first stack is made available to succeeding tacks (and so on), thereby boosting $CO_2$ partial pressure throughout the system. It is believed that in many instances, depending on the number of stacks in series and other factors, this will result in an improvement in cell performance coupled with either a reduction in equipment cost, or an increase in equipment cost which may be more than offset by improved performance. However, as will hereinafter be explained, the cost of adding additional stacks (due to required additional manifolding, controls, heat exchangers, etc.) may, at some point, override any resulting performance gain.

Economic and performance advantages or disadvantages of the present invention as compared to, for example, single pass process air cooling, will, in the final analysis, depend upon the constraints placed upon the system such as the desired temperature gradient across the cells, the pressures of the reactants, hydrogen utilization levels, thermal efficiency of the power section, type of feedstock used, and equipment cost. It is believed that, when all things are taken into consideration, there will be an optimum number of stacks to be connected in series for any given set of constraints. Generally speaking, however, if the process air flow rate is kept at the minimum needed to maintain an acceptable temperature gradient across all the stacks, the optimum number of stacks will be determined by the point at which the addition of another stack adds such a small performance benefit that the additional expense associated with the added stack is not warranted.

DESCRIPTION OF THE PREFERRED EMBODIMENT

Figure 1:
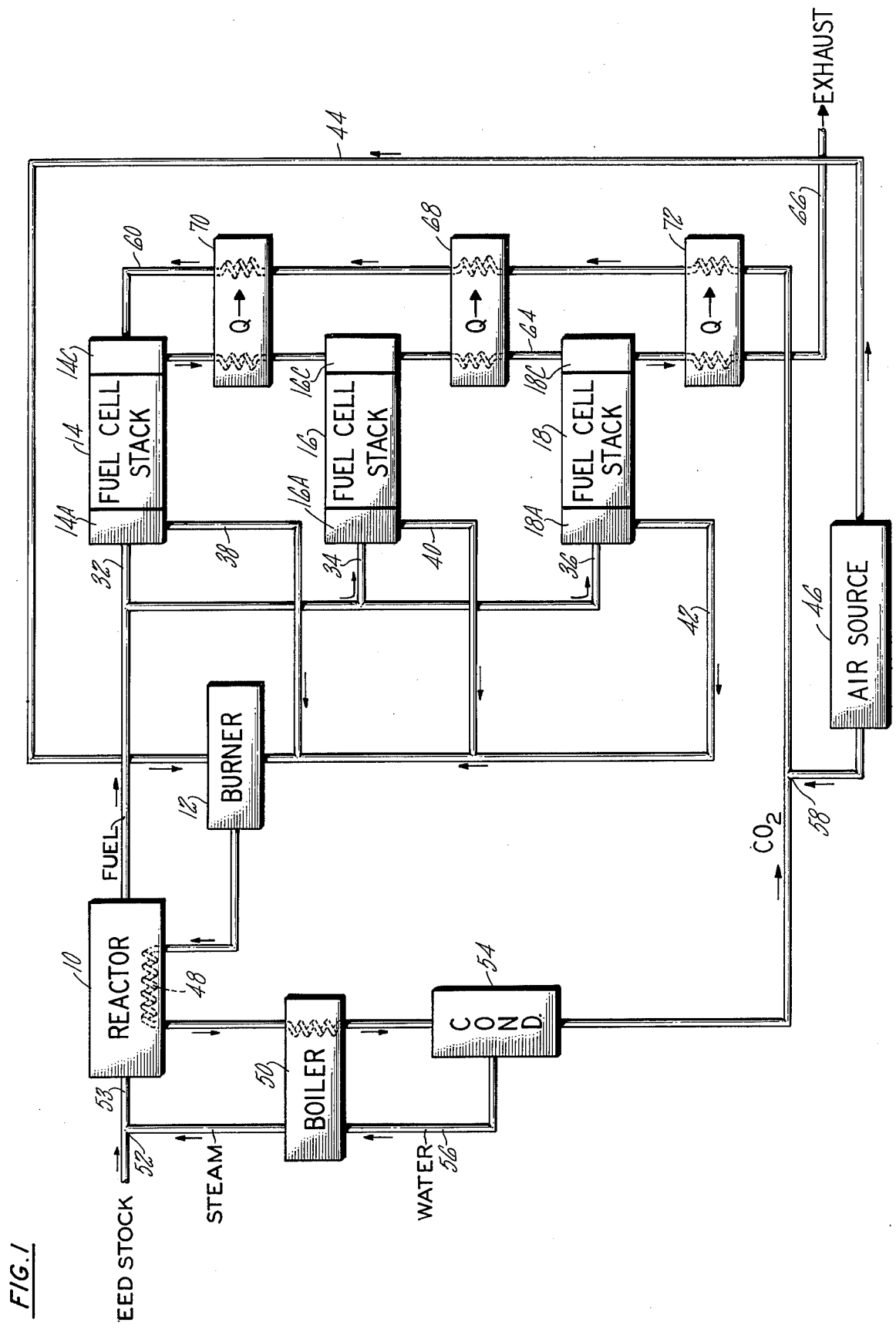
FIG. 1 is a schematic of a power plant according to the present invention.

Referring to FIG. 1, a schematic of a fuel cell power plant according to the present invention is shown. The power section is shown as comprising three stacks of fuel cells, the stacks having the reference numerals 14, 16, and 18, respectively. Each stack comprises a plurality of molten carbonate fuel cells connected electrically in series. Although three stacks are shown, this is by way of example only, the invention not being limited thereto.

Figure 2:
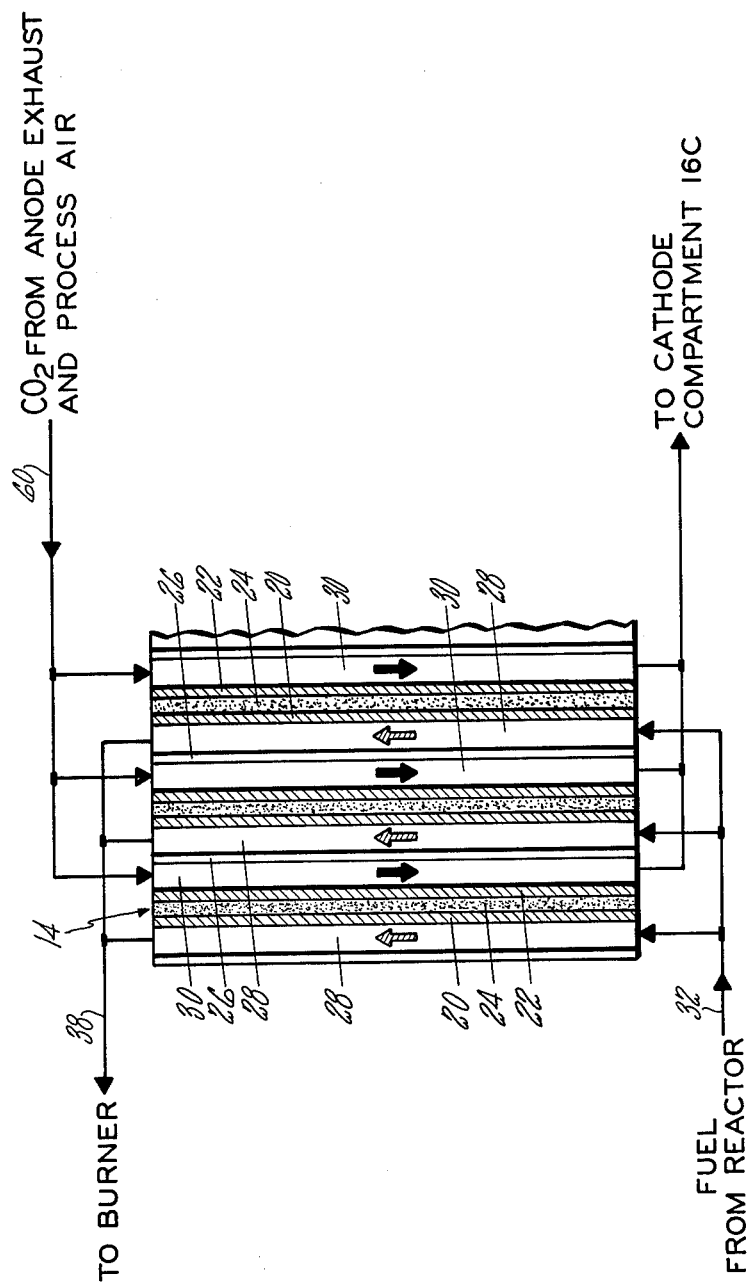
FIG. 2 is a cross sectional view, partly schematic, showing one of the fuel cell stacks of FIG. 1 in more detail.

Referring to FIG. 2, a more detailed representation of the stack 14 is shown. The stacks 16 and 18 may be identical to the stack 14. For the purposes of simplicity, the stack of FIG. 2 comprises only three cells; but, in an actual power plant each stack may contain upward of 100 or more cells. Preferably (but not necessarily), each stack should have the same number of cells. Each cell comprises an anode electrode 20 spaced apart from a cathode electrode 22. The space between the electrodes is filled with a molten carbonate electrolyte such as a mixture of potassium carbonate and lithium carbonate. The electrolyte is a solid at room temperature, but has a putty-like consistency at operating temperatures, which may be anywhere above the melting point of the electrolyte. Typical molten carbonate fuel cells operate in the range of 1100°–1300° F. Adjacent cells are separated from each other by gas impermeable plates 26 which are configured to define reactant gas spaces or compartments adjacent the nonelectrolyte side of the electrodes, such as the fuel or anode compartments 28 adjacent the anode electrodes 20, and the oxidant or cathode compartments 30 adjacent the cathode electrodes 22. In the schematic of FIG. 1 the anode compartments 28 or "anode side" of the stacks 14, 16, and 18 are represented by the reference numerals 14A, 16A, and 18A, respectively; the cathode compartments 30 or "cathode side" of the stacks are represented by the reference numerals 14C, 16C, and 18C.

The power plant also includes a steam reforming reactor 10. In the reactor 10 hydrogen is formed by reacting steam and a suitable carbonaceous feedstock, such as naphtha or natural gas, in the presence of a suitable catalyst such as nickel. Heat for the endothermic reaction is supplied by a burner 12.

In operation, reformed fuel (essentially hydrogen) from the reactor 10 is fed in parallel to the stacks 14, 16, and 18 via conduits 32, 34, and 36, respectively. The fuel passes through the anode sides 14A, 16A, and 18A of the stacks, reacting at the anode electrodes 20 to produce water, carbon dioxide, electricity and heat. The anode compartment exhaust, which includes unconsumed hydrogen, carbon dioxide, and water, leaves the stacks via the conduits 38, 40, and 42 and are fed to the burner 12.

In the burner 12 the unconsumed hydrogen in the anode exhaust burns with air supplied to the burner via a conduit 44 from a suitable source 46. If necessary, the burner may also have a separate fuel supply. The heat produced is transferred to the reactor 10 as represented by the heat exchanger 48. Additional heat in the burner exhaust is used to convert water to steam in a boiler 50. The steam from the boiler 50 is combined with the feedstock as at 52 and is introduced into the steam reforming reactor 10 via a conduit 53. The water in the anode exhaust is removed in a condenser 54 and is fed to the boiler 50 via a conduit 56. The anode exhaust, which still includes the carbon dioxide produced in the stacks, is thereupon combined at 58 with the process air from the air supply 46 for use at the cathode electrodes of the cells.

The process air mixed with the anode exhaust and therefore rich in $CO_2$ (the mixture hereinafter referred to as the cathode feed) is fed in series through the cathode sides 14C, 16C, and 18C of the stacks via the conduits 60, 62, and 64, respectively. At the cathode electrodes of the stacks 14, 16, and 18, the oxygen and $CO_2$ in the process air and the $CO_2$ from the anode exhaust react at the cathode electrodes according to equation (2) above. The depleted cathode feed is exhausted from the last stack in the series and vented to atmosphere as represented by the arrow 66.

As the cathode feed passes through each stack it picks up heat thereby cooling the stack. This heat is removed between stacks by passing the stack cathode exhaust through suitably sized heat exchangers, such as the heat exchangers represented by the numerals 68 and 70. Assuming stacks of equal size, it is preferable that the heat exchangers be designed to provide the same cathode feed inlet temperature to each stack in the series. Heat exchanger bypass conduits and other suitable controls (not shown) may be used if necessary. Although the heat removed from the cathode exhaust of each stack may be used for any suitable purpose, (or may even be thrown away) in this embodiment it is used to preheat the cathode feed to the first stack in order that it, too, will have the same inlet temperature as the other stacks in the series. In this embodiment the heat in the cathode exhaust from the last stack in the series is also used to preheat the cathode feed to the first stack by means of another heat exchanger 72. It should be apparent that, depending upon the heat available and required at other locations in the power plant, many different heat exchanger arrangements for accomplishing the results set forth above could be devised.

A study was made to determine, for one particular set of constraints, the advantages and/or disadvantages of the present invention as compared to a power plant having stacks cooled by either single pass (i.e., parallel flow) process air cooling or by separate air cooling. The power plant studied was considered to be designed essentially as shown in FIG. 1, with the stack cooling scheme being varied as required for the purposes of the study. The constraints which were critical to this analysis were as follows:

Feedstock: light naphtha
Average stack temperature: 1200° F
Average ΔT across the tacks: 200° F
Power section thermal efficiency: 63%
Hydrogen utilization (overall):
($H_2$ converted to electricity /$H_2$ fed to fuel cell) = 86%
Reactant pressure: atmospheric "Power section," as that term is used above, includes only the stacks and their attendant plumbing; heat exchangers are not considered part of the power section.

The results of the study indicated that multi-pass process air cooling according to the present invention yields the lowest power plant cost per kilowatt by permitting the combining of the best features of single pass process air cooling and separate air cooling; i.e., simple stack design to minimize cost (single pass process air cooling feature) and high partial pressure of $CO_2$ at the cathode to maximize cell performance (separate air cooling feature).

To be more specific, at the power section design point of 63% thermal efficiency, cell performance (in terms of watts per square foot of electrode surface) with two and three stacks in series according to the present invention was estimated to be 46% and 77% higher, respectively, than cell performance in a single pass process air cooling system. Actually, cell performance of three stacks in series is about equal to cell performance using separate air cooling, but without the complexity and cost. Four (or more) stacks in series provide little or no improvement in performance as compared to three stacks.

The study also showed that the multi-pass process air cooling system of the present invention increases the number of heat exchangers required as compared to other cooling modes, but decreases total heat exchanger heat transfer surface area requirements. For example, at the design point of 63% power section thermal efficiency the required heat transfer area of a three stack system designed according to the present invention is only about 15% of the area required in a single pass process air cooling system; and is about half that required by a two stack multi-pass process air cooling system. This reduction in required heat transfer area contributes substantially to the economic attractiveness of the present invention.

From the foregoing it is apparent that, at least for a power plant with the constraints as set forth above, the present invention is an improvement over the other cooling systems herein discussed. It is also apparent that, for these constraints, three stacks in series produce optimum results.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a process for operating a fuel cell power plant including a plurality of stacks each comprising a plurality of molten carbonate fuel cells, each stack having an anode side and a cathode side, the steps of:
 supplying fuel to the anode side of said stacks,
 preheating process air to obtain a suitable cathode feed temperature at the inlet of a first of said stacks;
 introducing the $CO_2$ produced at the anode side of all of said stacks and said preheated process air into the cathode side of said first of said stacks and from said first stack in series through the cathode sides of the remaining stacks; and
 removing sufficient heat from the cathode side exhaust between each pair of consecutive stacks in the series to provide a desired cathode feed temperature to the inlet of each stack after said first stack.

2. The process according to claim 1 wherein said step of removing heat includes using said heat to preheat the process air being introduced into said first stack in the series.

3. The process according to claim 2 including removing heat from the cathode feed after it is exhausted from the last stack in the series and using said heat to preheat the process air being introduced into said first stack in the series.

4. The process according to claim 1 wherein said step of supplying fuel includes supplying fuel to said stacks in parallel.

5. The process according to claim 1 wherein said step of introducing $CO_2$ into said first stack includes introducing the anode side exhaust from each stack into burner means for burning unconsumed fuel therein, and introducing said burner means exhaust into said first stack.

6. The process according to claim 1 wherein said step of removing heat includes removing sufficient heat between stacks to result in substantially the same cathode feed temperature at the inlet of the cathode side of each stack in the series.

7. A fuel cell power plant including:
 a plurality of fuel cell stacks, each stack comprising a plurality of molten carbonate fuel cells, each of said stacks also comprising an anode side and a cathode side, said anode side including inlet means and outlet means, said cathode side including inlet means and outlet means;
 first connecting means connecting said cathode sides in series gas flow relationship;
 a source of air;
 second connecting means connecting said source of air to said cathode side inlet means of said first stack in the series for providing process air to said first stack and to succeeding stacks in the series via said first connecting means;
 means constructed and arranged for transferring $CO_2$ produced at said anode sides of all of said plurality of stacks to said cathode side inlet means of said first stack in the series for providing $CO_2$ to said first stack and for providing $CO_2$ to succeeding stacks in the series via said first connecting means,
 heat exchanger means associated with said first connecting means between each pair of consecutive stacks in the series for removing heat from the cathode side exhaust between stacks; and a source of fuel in gas communication with said anode side inlet means of said stacks for providing fuel to said stacks.

8. The fuel cell power plant according to claim 7 wherein said heat exchanger means is also associated with said second connecting means and includes means for transferring heat from the cathode side exhaust to said process air being supplied to said first stack.

9. The fuel cell power plant according to claim 7 wherein said means constructed and arranged for transferring $CO_2$ produced at said anode sides of said stacks to said cathode side inlet means of said first stack includes burner means, means for supplying said anode side exhaust to said burner means, and means for supplying the exhaust from said burner means to said cathode side inlet means of said first stack.

10. The process according to claim 6 wherein the step of introducing process air into said first of said stacks includes introducing process air at the minimum flow rate needed to maintain an acceptable temperature gradient across each of said stacks.

* * * * *